(12) United States Patent
Lee et al.

(10) Patent No.: US 9,288,519 B2
(45) Date of Patent: Mar. 15, 2016

(54) DISPLAY APPARATUS, SERVER AND CONTROL METHOD THEREOF

(71) Applicant: SAMSUNG ELECTRONICS CO., LTD., Suwon-si (KR)

(72) Inventors: Sang-kwon Lee, Suwon-si (KR); Sung-wan Koo, Seoul (KR); Sang-hee Kim, Hwaseong-si (KR); Jung-a Kim, Seoul (KR); Jong-woo Kim, Seoul (KR); Yun-hee Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/104,108

(22) Filed: Dec. 12, 2013

(65) Prior Publication Data

US 2014/0229990 A1    Aug. 14, 2014

(30) Foreign Application Priority Data

Feb. 13, 2013   (KR) .................. 10-2013-0015501

(51) Int. Cl.
*G06F 3/00* (2006.01)
*G06F 13/00* (2006.01)
*H04N 5/445* (2011.01)
*H04H 60/32* (2008.01)
*H04N 21/262* (2011.01)
*H04N 21/442* (2011.01)
*H04N 21/45* (2011.01)
(Continued)

(52) U.S. Cl.
CPC ....... *H04N 21/26283* (2013.01); *H04N 21/251* (2013.01); *H04N 21/25891* (2013.01); *H04N 21/4147* (2013.01); *H04N 21/4312* (2013.01); *H04N 21/4334* (2013.01); *H04N 21/44222* (2013.01); *H04N 21/4532* (2013.01); *H04N 21/4826* (2013.01); *H04N 21/4882* (2013.01); *H04N 21/654* (2013.01); *H04N 21/6547* (2013.01); *H04N 21/6582* (2013.01); *H04N 21/84* (2013.01); *H04N 5/44543* (2013.01); *H04N 21/47202* (2013.01)

(58) Field of Classification Search
None
See application file for complete search history.

(56) References Cited

U.S. PATENT DOCUMENTS 7,610,301 B2    10/2009   Ito
2006/0026642 A1*    2/2006   Schaffer et al. ................. 725/46
(Continued)

FOREIGN PATENT DOCUMENTS

KR    10-2012-0080985 A    7/2012

OTHER PUBLICATIONS

Search Report dated Mar. 4, 2014, issued by the International Searching Authority in counterpart International Application No. PCT/KR2013/010368.

(Continued)

*Primary Examiner* — Nathan Flynn
*Assistant Examiner* — William J Kim
(74) *Attorney, Agent, or Firm* — Sughrue Mion, PLLC

(57) ABSTRACT

A display apparatus includes a display configured to display an image of a broadcasting program; a communication section configured to communicate with a server; a controller configured to control to transmit view information about a broadcasting program viewed by a user to the server, receive information about a broadcasting program recommended corresponding to the view information from the server, and provide schedule information of the recommended broadcasting program in accordance with a time slot in which the recommended broadcasting program is broadcasted.

25 Claims, 13 Drawing Sheets

(51) Int. Cl.
*H04N 21/482* (2011.01)
*H04N 21/25* (2011.01)
*H04N 21/258* (2011.01)
*H04N 21/4147* (2011.01)
*H04N 21/431* (2011.01)
*H04N 21/433* (2011.01)
*H04N 21/488* (2011.01)
*H04N 21/654* (2011.01)
*H04N 21/658* (2011.01)
*H04N 21/84* (2011.01)
*H04N 21/6547* (2011.01)
*H04N 21/472* (2011.01)

(56) References Cited

U.S. PATENT DOCUMENTS

| | | |
|---|---|---|
| 2006/0250650 A1 | 11/2006 | Narahara et al. |
| 2007/0154163 A1 | 7/2007 | Cordray |
| 2007/0157249 A1* | 7/2007 | Cordray et al. ................. 725/58 |
| 2008/0244656 A1 | 10/2008 | Sumiyoshi et al. |
| 2008/0271078 A1 | 10/2008 | Gossweiler et al. |
| 2009/0077064 A1* | 3/2009 | Daigle .............................. 707/5 |
| 2010/0005492 A1 | 1/2010 | Takano et al. |
| 2010/0260480 A1 | 10/2010 | Maeda |
| 2010/0281506 A1* | 11/2010 | Schmidt et al. ................. 725/46 |
| 2011/0154399 A1 | 6/2011 | Jin et al. |
| 2011/0247036 A1 | 10/2011 | Adimatyam et al. |
| 2012/0030697 A1 | 2/2012 | Yamamoto |
| 2012/0072941 A1* | 3/2012 | Thornberry et al. ............ 725/14 |
| 2012/0180090 A1 | 7/2012 | Yoon et al. |
| 2012/0246680 A1 | 9/2012 | Hirota et al. |
| 2012/0331494 A1 | 12/2012 | Pontual et al. |

OTHER PUBLICATIONS

Communication dated May 20, 2014, issued by the European Patent Office in counterpart European Application No. 13194901.8.

* cited by examiner

FIG. 6

<BROADCASTING PROGRAM>　　<VIEWED OR NOT>

Lost Season 1, EPISODE 1 ——　　VIEWED
Lost Season 1, EPISODE 2 ——　　VIEWED
Lost Season 1, EPISODE 3 ——　　VIEWED ⇒ USER IS EXPECTED TO VIEW "LOST SEASON 1, EPISODE 4"
⇒ "LOST SEASON 1, EPISODE 4" IS DETERMINED AS
   RECOMMENDED PROGRAM

FIG. 7

<BROADCASTING PROGRAM>　　<VIEWED OR NOT>

Lost Season 1, EPISODE 1 ——　　VIEWED
Lost Season 1, EPISODE 2 ——　　VIEWED
Lost Season 1, EPISODE 3 ——　　VIEWED
Lost Season 1, EPISODE 4 ——　　VIEWED
Lost Season 1, EPISODE 5 ——　　NOT VIEWED
Lost Season 1, EPISODE 6 ——　　NOT VIEWED ⇒ USER IS EXPECTED NOT TO VIEW "LOST SEASON 1, EPISODE 7"
⇒ "LOST SEASON 1, EPISODE 7" IS EXCLUDED FROM
   RECOMMENDED PROGRAMS

DISPLAY APPARATUS, SERVER AND CONTROL METHOD THEREOF

CROSS-REFERENCE TO RELATED APPLICATION

This application claims priority from Korean Patent Application No. 10-2013-0015501, filed on Feb. 13, 2013, in the Korean Intellectual Property Office, the disclosure of which is incorporated herein it its entirety by reference.

BACKGROUND

1. Field

Apparatuses and methods consistent with exemplary embodiments relate to a display apparatus, a server, and a control method thereof, and more particularly, to a display apparatus, a server, and a control method thereof, in which information about a broadcast program is provided.

2. Description of the Related Art

A display apparatus such as a television (TV) or the like receives a broadcasting signal of a predetermined channel and displays an image of a program (hereinafter, referred to as 'broadcasting program') contained in the broadcasting signal. The display apparatus may receive information about a broadcasting program, for example, an electronic program guide (EPG) (hereinafter, referred to as 'program information') from a server connected through a network such as Internet, and provide the program information to a user. The user may use the provided program information to view or record a desired broadcasting program or to perform a scheduled viewing or recording with regard to the broadcasting program.

However, a related art display apparatus simply provides the program information such as a broadcasting schedule or channel information. Thus, related art program information has a limited utility. Also, the user needs to register a user's preferred channel or program as a favorite channel or program. Further, it is inconvenient for the user to look up a broadcast time slot of a desired program in the program information to view or record the desired program or to perform scheduled viewing or recording at the broadcast time slot of the desired program.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus, a server, and a control method thereof, which may provide information of a broadcasting program recommended to a user or perform to display, alert, record, schedule a recording, etc. for the recommended broadcasting program without a command from the user.

According to an aspect of an exemplary embodiment, a display apparatus includes a display configured to display an image of a broadcasting program; a communication section configured to communicate with a server; a controller configured to control to transmit view information about a broadcasting program viewed by a user to the server, receive information about a recommended broadcasting program corresponding to the view information from the server, and provide schedule information of the recommended broadcasting program in accordance with a time slot in which the recommended broadcasting program is broadcasted.

The controller may control to record the recommended broadcasting program when the user does not view the recommended broadcasting program at the time slot in which the recommended broadcasting program is broadcasted.

The controller may control to provide video on demand (VOD) of the recommended broadcasting program when the user does not view the recommended broadcasting program at the time slot in which the recommended broadcasting program is broadcasted.

The view information may include information about at least one from among a viewed channel, a title of the broadcasting program, and a viewing time.

The recommended broadcasting program may include at least one from among a series of episodes of the recommended broadcasting program.

The recommended broadcasting program may correspond to a view profile of the user including at least one from among a title, a cast, a director, a genre, a synopsis of the viewed broadcasting program.

The controller may control the display to display the schedule information about the recommended broadcasting program in a form of a graphic user interface (GUI) thereon.

The controller may display a plurality of recommended broadcasting programs in accordance with respective priorities thereof.

The controller may notify the user about the recommended broadcasting program.

The controller may send the server information about whether to record the recommended broadcasting program.

According to an aspect of another exemplary embodiment, a method of controlling a display apparatus includes: sending a server view information about a broadcasting program viewed by a user; receiving information about a recommend broadcasting program corresponding to the view information from the server; and providing schedule information about the recommended broadcasting program in accordance with a time slot in which the recommended broadcasting program is broadcasted.

The method may further include recording the recommended broadcasting program when the user does not view the recommended broadcasting program at the time slot in which the recommended broadcasting program is broadcasted.

The method may further include providing video on demand (VOD) of the recommended broadcasting program when the user does view the recommended broadcasting program at the time slot in which the recommended broadcasting program is broadcasted.

The view information may include information about at least one from among a viewed channel, a title of the viewed broadcasting program, and a viewing time.

The recommended broadcasting program may include at least one from among a series of episodes of the recommended broadcasting program.

The recommended broadcasting program may correspond to a view profile of the user including at least one from among a title, a cast, a director, a genre, a synopsis of the viewed broadcasting program.

The providing the schedule information may include displaying the schedule information about the recommended broadcasting program in a form of a graphic user interface (GUI).

The providing the schedule information may include displaying a plurality of recommended broadcasting programs in accordance with respective priorities thereof.

The method may further include the user about the recommended broadcasting program.

The method may further include sending the server information about whether to record the recommended broadcasting program.

According to an aspect of still another exemplary embodiment, a server includes: a communication section configured to communicate with a display apparatus which displays an image of a broadcasting program based on a broadcasting signal; a storage configured to store information about the broadcasting program; and a controller configured to receive view information about a broadcasting program viewed by a user from the display apparatus, determine a recommended broadcasting program corresponding to the view information, and transmit information about the recommended broadcasting program to the display apparatus.

The view information may include information about at least one from among a viewed channel, a title of the viewed broadcasting program, and a viewing time.

The recommended broadcasting program may include at least one from among a series of episodes of the recommended broadcasting program.

The controller may control to receive updated view information from the display apparatus and, when a broadcasting program is determined not to be viewed by the user according to the updated view information, the controller controls to remove the corresponding broadcasting program from a list of recommended broadcasting programs.

The recommended broadcasting program may correspond to a view profile of the user including at least one from among a title, a cast, a director, a genre, a synopsis of the viewed broadcasting program.

The information about the recommended broadcasting program may include information about priorities of a plurality of recommended broadcasting programs.

The controller may control to receive information about whether to record the recommended broadcasting program from the display apparatus and control to send the display apparatus the information about the recommended broadcasting program based on the received information.

According to an aspect of still another exemplary embodiment, a method of controlling a server includes: receiving view information about a broadcasting program viewed by a user from a display apparatus which displays an image of a broadcasting program based on a broadcasting signal; determining a recommended broadcasting program corresponding to the view information; and sending the display apparatus information about the recommended broadcasting program.

The view information may include information about at least one from among a viewed channel, a title of the viewed broadcasting program, and a viewing time.

The recommended broadcasting program may include at least one from among a series of episodes of the recommended broadcasting program.

The sending may include receiving updated view information from the display apparatus and, when a broadcasting program is determined not to be viewed by the user, removing the corresponding broadcasting program from a list of recommended broadcasting programs.

The recommended broadcasting program may correspond to a view profile of the user including at least one from among a title, a cast, a director, a genre, a synopsis of the viewed broadcasting program.

The information about the recommended broadcasting program may include information about priorities of a plurality of recommended broadcasting programs.

The method may further include: receiving information about whether to record the recommended broadcasting program from the display apparatus; and sending the display apparatus the information about the recommended broadcasting program based on the received information.

According to an aspect of still another exemplary embodiment,

BRIEF DESCRIPTION OF THE DRAWINGS

The above and/or other aspects will become more apparent by describing certain exemplary embodiments with reference to the accompanied drawings in which:

FIG. 6 is a view for explaining a process of determining a recommended program according to an exemplary embodiment;

FIG. 7 is another view for explaining a process of excluding a broadcast program from recommended programs according to an exemplary embodiment;

DETAILED DESCRIPTION

Figure 1:
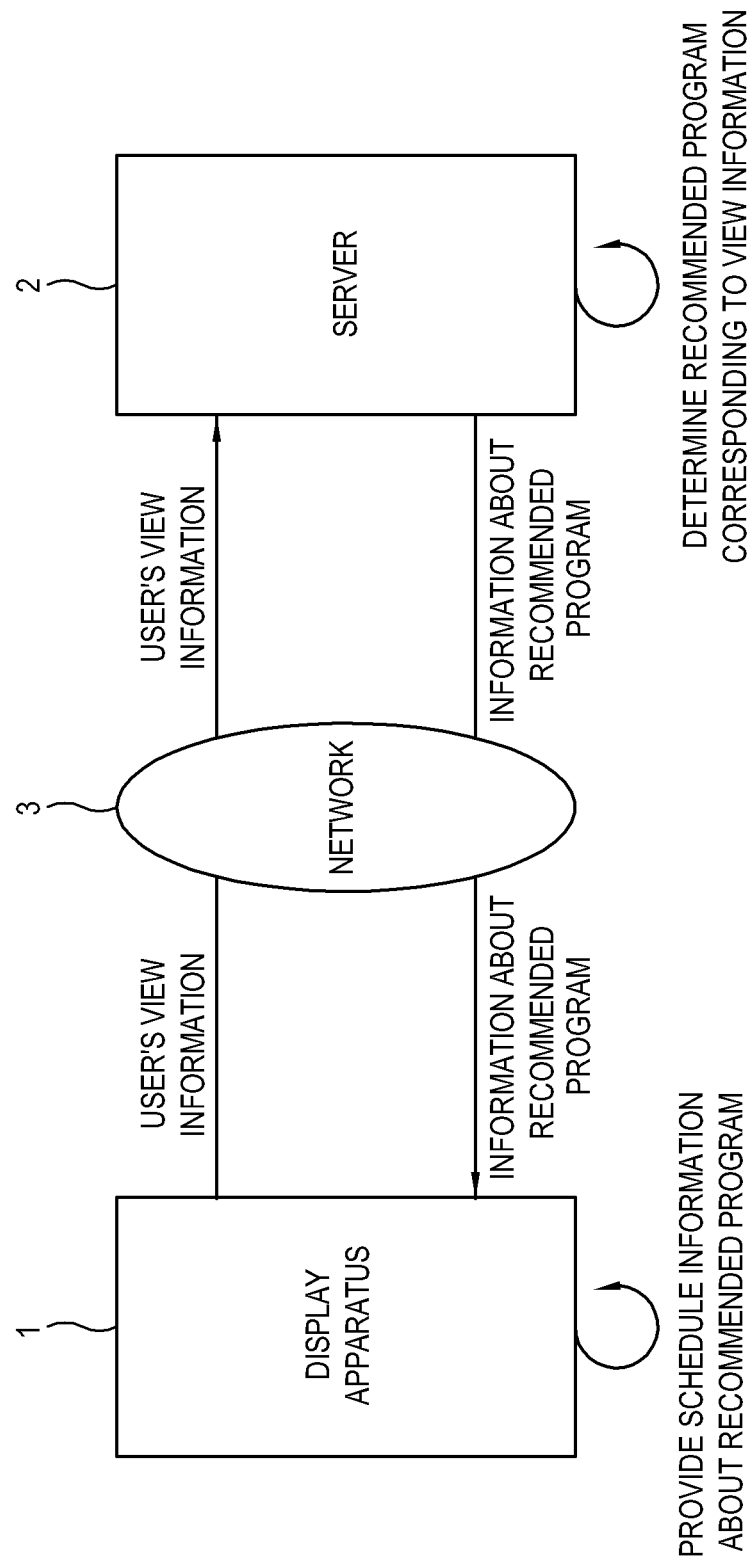
FIG. 1 illustrates a display apparatus and a server according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 illustrates a display apparatus and a server according to an exemplary embodiment. A display apparatus 1 is connected to a server 2 through a network 3 such as, for example, Internet. The display apparatus 1 may be an apparatus such as a television (TV), a smart phone, a smart pad, a personal computer (PC), etc., which may display an image based on a broadcasting signal. The display apparatus 1 monitors which broadcasting program viewed by a user and collects information about the viewed broadcasting program (hereinafter, 'view information'). The display apparatus 1 transmits the collected user view information to the server 2. The server 2 determines a broadcasting program, which is estimated to be preferred by the user and recommended to the user (hereinafter, 'recommended program'), based on the user's view information received from the display apparatus 1. The server 2 transmits information about the determined recommended program to the display apparatus 1. The information about the recommended program may include a channel name, a channel number, a program name, a broadcast starting time, a broadcast ending time, etc. of the recommended program. The display apparatus 1 provides schedule information of the recommended program based on the information of the recommended program transmitted from the server 2. The schedule information of the recommended program may include information of channels and/or timeslots (e.g., time slots) of recommended programs to be broadcasted. The schedule information may further contain additional information related to a corresponding recommended program such as, for example, a synopsis, a cast, a poster image, etc. of each recommended program. Therefore, although the user does not designate his or her preferred broadcasting programs, the user may be provided with recommended programs, which are determined to be likely to be preferred by the user, through the schedule information of the recommended program. Also, the user may view the recommended program in a desired time by recording the recommended program according to the timeslots thereof through the schedule information. Thus, user convenience may be improved.

Figure 2:
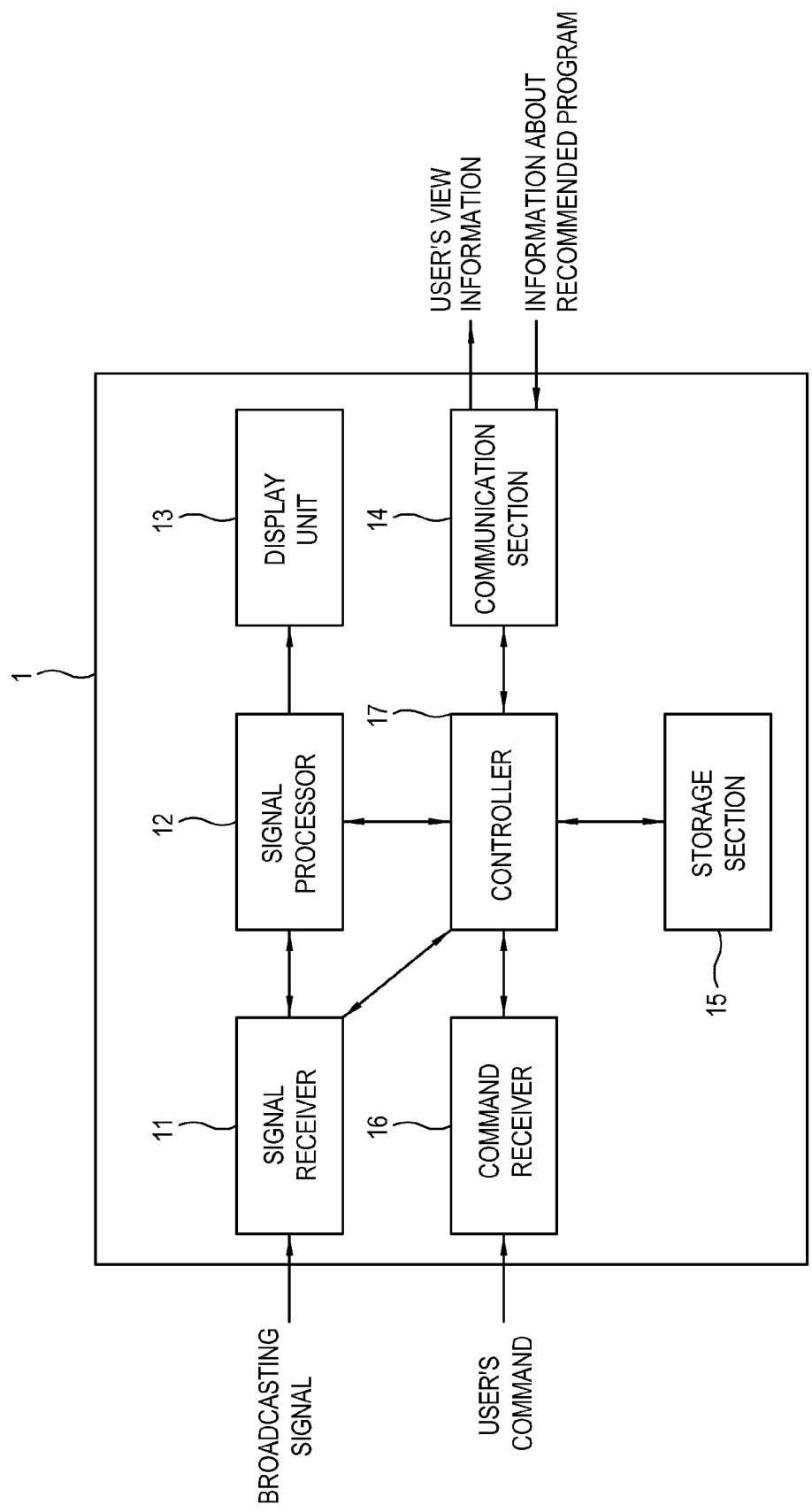
FIG. 2 illustrates a configuration of a display apparatus according to an exemplary embodiment.

FIG. 2 illustrates a configuration of a display apparatus 1 according to an exemplary embodiment. The display apparatus 1 includes a signal receiver 11, a signal processor 12, a display 13, a communication section 14, and a controller 17. The signal receiver 11 receives a broadcasting signal. The broadcasting signal may be transmitted through, for example, airwave broadcasting, cable broadcasting, satellite broadcasting and the like methods. The broadcasting signal may include a plurality of channels. The signal receiver 11 receives a broadcasting signal of a channel selected by a user from among a plurality of channels. The signal processor 12 processes the broadcasting signal received in the signal receiver 11 to be displayed as an image on the display 13. The display 13 displays an image based on the broadcasting signal processed by the signal processor 12. The communication section 14 communicates with the server 2. The communication section 14 transmits the collected user view information to the server 2 and receives information about the recommended program from the server 2.

The controller 17 generally controls the display apparatus 1. The controller 17 may include at least one from among a control program, a nonvolatile memory such as a flash memory or the like to store the control program, a volatile memory such as a random access memory (RAM) for loading at least a portion of the control program, and a microprocessor for executing the loaded control program.

Figure 3:
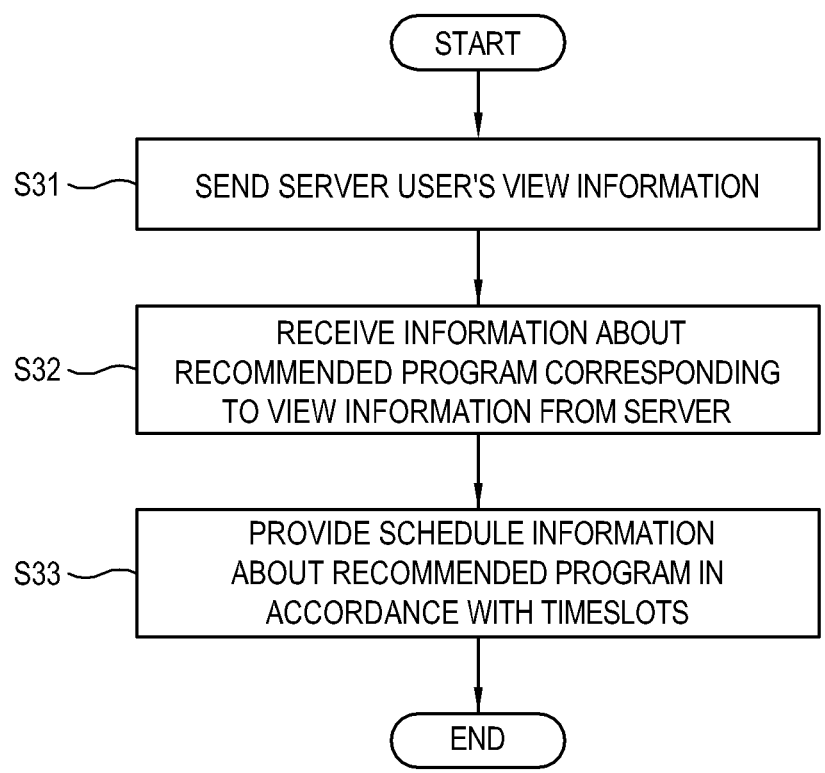
FIG. 3 is a flowchart illustrating an operation of a display apparatus according to an exemplary embodiment.

FIG. 3 is a flowchart illustrating an operation of the display apparatus 1 according to an exemplary embodiment. The display apparatus 1 transmits a user's view information, i.e., information about a broadcasting program viewed by the user, to the server 2 (S31). The display apparatus 1 may transmit the user's view information to the server 2 periodically. The display apparatus 1 may collect the view information based on a user's viewing pattern. The display apparatus 1 monitors which broadcasting program is viewed by the user and thus provides the information about the broadcasting program viewed by the user as the view information. The user's view information may include information about, for example, at least one of a channel, a program title, a broadcasting time, and a broadcasting provider of the viewed broadcasting program. For example, when the user views a certain broadcasting program for ten minutes, the display apparatus 1 may determine a channel, a program title, and a viewing time (e.g., ten minutes or starting and ending times of the viewing) of the corresponding program as the view information. The display apparatus 1 may transmit identification (ID) information of the broadcasting program viewed by the user as the view information to the server 2. The ID information of the broadcasting program may be obtained from an electronic program guide (EPG) of a broadcasting signal. The display apparatus 1 may receive the EPG information from the server 2. The display apparatus 1 may transmit the corresponding view information to the server 2 when the viewing of the broadcasting program is ended. The display apparatus may transmit the corresponding view information to the server 21 in a predetermined cycle.

Next, the display apparatus 1 receives information about the recommended program corresponding to the user's view information from the server 2 (S32). The display apparatus 1 may receive the recommended program corresponding to the user's view information from the server 2 in a predetermined cycle. For example, the display apparatus 1 may receive the information of the recommended program from the server 2 at least once every day. The display apparatus 1 provides the schedule information based on the information received from the server 2, in accordance with timeslots of the recommended program (S33).

Referring back to FIG. 2, the display apparatus 1 may further include a storage 15 to store data or information needed for operating the display apparatus 1, and a command receiver 16 to receive a user's command.

Figure 4:
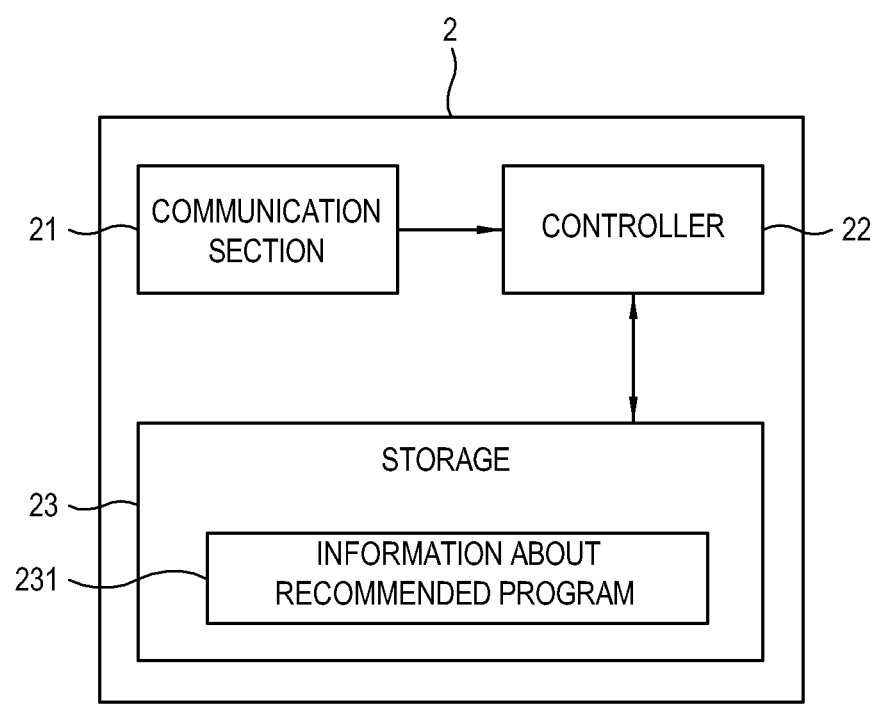
FIG. 4 illustrates a configuration of a server according to an exemplary embodiment.

FIG. 4 illustrates a configuration of the server 2 according to an exemplary embodiment. The server 2 may include a communication section 21, a storage 23 and a controller 22. The communication section 21 communicates with the display apparatus 1. Under control of the controller 22, the communication section 21 receives a user's view information about the broadcasting program from the display apparatus 1 and transmits information about the recommended program corresponding to the received user's view information to the display apparatus 1. The storage 23 stores the information 231 of the recommended program.

The controller 22 controls an overall operation of the server 2. The controller 22 may include at least one from among a control program, a nonvolatile memory such as a flash memory or the like to store the control program, a volatile memory such as a random access memory (RAM) for loading at least a portion of the control program, and a microprocessor for executing the loaded control program.

Figure 5:
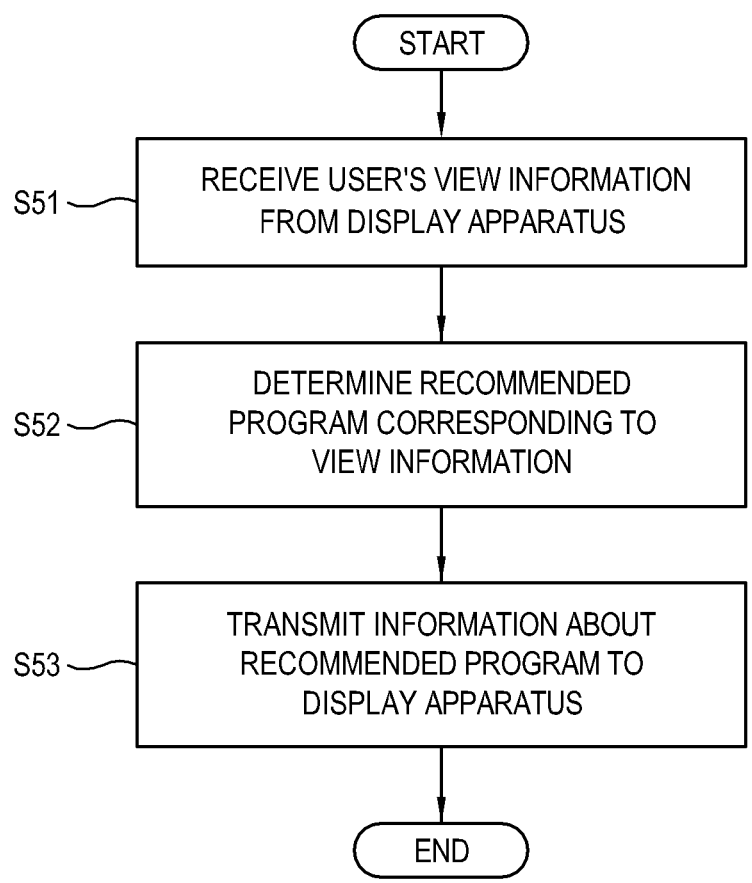
FIG. 5 is a flowchart illustrating an operation of a server according to an exemplary embodiment.

FIG. 5 is a flowchart illustrating an operation of the server 2 according to an exemplary embodiment. The server 2 receives the user's view information about the broadcasting program viewed by the user from the display apparatus 1 (S51). Next, the server 2 determines the recommended program corresponding to the user's view information (S52). Next, the server 2 transmits information of the determined recommended program to the display apparatus 1 (S53).

FIG. 6 is a view for explaining a process of determining a recommended program according to an exemplary embodiment. Specifically, FIG. 6 illustrates a broadcasting program obtained from a user's view information received from the display apparatus 1, and information about whether a user has viewed the broadcasting program. The server 2 may receive ID information of the broadcasting program viewed by the user as the user's view information. Based on the EPG information and the ID information of the broadcasting program received from the display apparatus 1, the server 2 may check a channel, a program title, etc. of the broadcasting program viewed by the user. The server 2 may determine the recommended program based on the user's view information received from the display apparatus 1. In an exemplary embodiment, the server 2 may determine the recommended program when the user's view information is received from the display apparatus 1 a predetermined number times. Referring to FIG. 6, the server 2 may determine that the user has viewed three episodes ('an episode 1', 'an episode 2' and 'an episode 3') of the broadcasting program (for example, 'Lost Season 1') based on the view information. Thus, the server 2 may estimate that the user is likely to view the next episode (i.e., 'an episode 4') of the broadcasting program (i.e., 'Lost Season 1') based on a user's viewing pattern with respect to the broadcasting program. Thus, the server 2 may determine the next episode of the broadcasting program (i.e., the 'Lost Season 1, the episode 4') as the recommended program. Thus, in an exemplary embodiment, when a series of episodes of a broadcasting program are continuously viewed, for example, three or more consecutive episodes are viewed, it may be determined that the user is likely to view the next episode of the broadcasting program. Here, a number of episodes of a particular broadcasting program viewed by the user for determining the particular broadcasting program as the recommended program may be varied depending on embodiments.

FIG. 7 is another view for explaining a process of determining a recommended program according to an exemplary embodiment. Specifically, FIG. 7 illustrates the broadcasting program obtained from a user's view information received from the display apparatus 1, and information about whether a user has viewed the broadcasting program. Referring to FIG. 7, the server 2 may determine that a user has viewed several consecutive episodes (e.g., 'an episode 1', 'an episode 2', 'an episode 3' and 'an episode 4') of the broadcasting program (for example, 'Lost Season 1') but has not viewed next two episodes (e.g., 'an episode 5' and 'an episode 6') of the broadcasting program based on the view information. In this case, for example, the server 2 may estimate that the user is unlikely to view the next episode (i.e., 'an episode 7') of the broadcasting program 'Lost Season 1' based on a user's viewing pattern with respect to the broadcasting program. Thus, the server 2 may not determine the broadcasting program (i.e., the 'Lost Season 1') as the recommended program may be excluded from recommended programs. In an exemplary embodiment, when a predetermined number of consecutive episodes of a broadcasting program, for example, three or more episodes of the broadcasting program have not been viewed, it may be determined that the user is unlikely to view the next episode of the broadcasting program. Here, a number of episodes of a particular broadcasting program which have not been viewed by the user for determining whether to exclude the particular broadcasting program from the recommended programs may be varied depending on embodiments.

The server 2 may provide the display apparatus 1 with the information of the recommended program corresponding to the user's view information in the form of a list of recommended programs (hereinafter, 'recommended list'). The recommended list in an exemplary embodiment may include the recommended program described with reference to FIGS. 6 and 7. As shown in FIG. 6, the server 2 may add the next episode of the broadcasting program (i.e., 'an episode 4' of 'Lost Season 1'), which is determined as the recommended program, to a recommended list for a corresponding user. Alternatively, as shown in FIG. 7, the server 2 may exclude the next episode of the broadcasting program (i.e., 'an episode 7' of 'Lost Season 1'), which is previously determined as the recommended program but determined as not currently being the recommended program, from the recommended list for the corresponding user.

Figure 8:
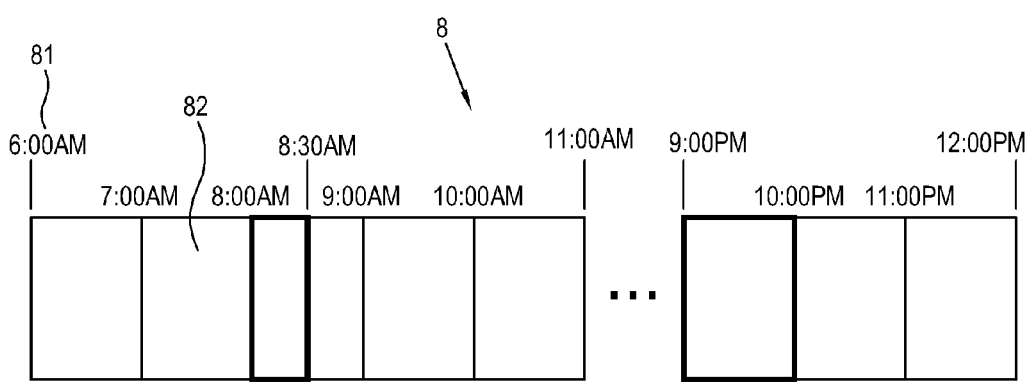
FIG. 8 shows an example of generating a list of a recommended program in accordance with timeslots thereof according to an exemplary embodiment.

The server 2 may generate a recommended list in accordance with timeslots of the recommended program in the recommended list. FIG. 8 shows an example of generating a recommended list of a recommended program in accordance with timeslots thereof according to an exemplary embodiment. As shown in FIG. 8, the server 2 may generate a recommended list including recommended programs corresponding to a broadcasting schedule from, for example, 6:00 A.M. to 12:00 P.M. In detail, the recommended list 8 may include a recommended program 82 in accordance with a timeslot 81 from 6:00 A.M. to 7:00 A.M. In this embodiment, the recommended list 8 corresponding to the broadcasting schedule of one day will be described as an example. However, it should be noted that, in an alternative embodiment, the recommended list 8 may correspond to a broadcasting schedule of a plurality of days. The server 2 may generate the recommended list 8 such that the recommended programs have a priority, which will be described with reference to FIG. 9.

Figure 9:
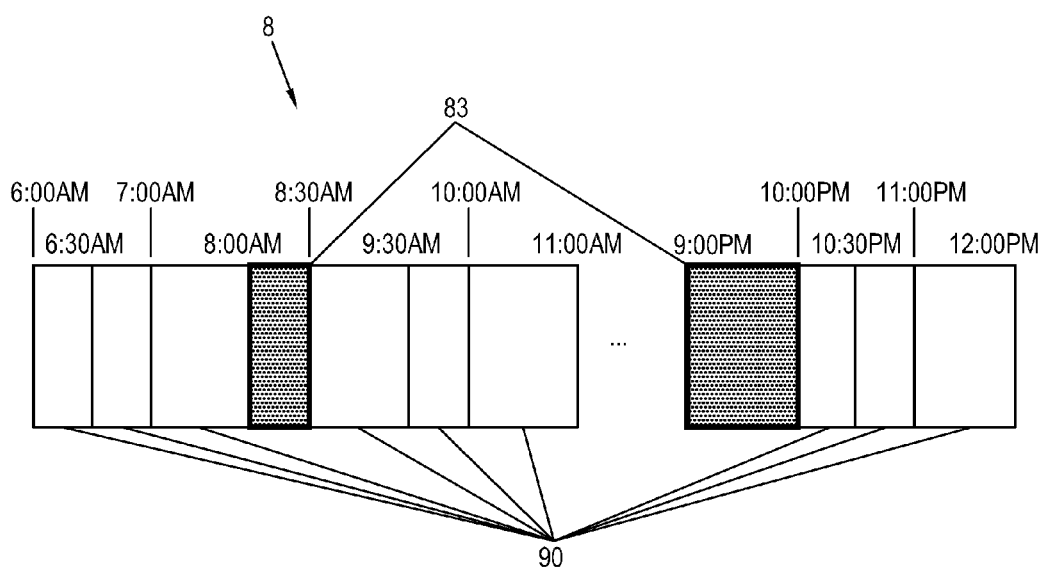
FIG. 9 shows another example of generating a list of a recommended program in accordance with timeslots thereof according to an exemplary embodiment.

FIG. 9 shows another example of generating a recommended list of a recommended program in accordance with timeslots thereof according to an exemplary embodiment. The server 2 may arrange the recommended list 8 according to a priority thereof. For example, in the recommended list 8, timeslots (e.g., from 8:00 A.M. to 8:30 A.M. and from 9:00 P.M. to 10:00 P.M.) during which recommended programs 83 are broadcasted may be highlighted. Based on priorities of respective recommended programs, the server 2 may preferentially add the recommended program 83 having a higher priority to the recommended list 8 and fills the other timeslots with the other recommended programs 90 having a lower priority. Priorities of recommended programs 90 and 83 may be determined by various methods. In an exemplary embodiment, the server 2 may determine that a broadcasting program with a higher possibility of being viewed by a user has a higher priority than other broadcasting programs. For example, the recommended program 30 may be a broadcasting program of which previous episodes have been viewed by the user. The recommended programs 90 may be recommended programs not viewed by the user but determined as recommendable based on a user's view profile. The user's view profile is information of a broadcasting program viewed by the user. For example, the user's view profile may include information such as a title, a cast, a director, a genre, a synopsis, etc. of a broadcasting program frequently viewed by the user. The server 2 may locate a broadcasting program having a profile similar to the user's view profile by referring to the EPG information and determine the located broadcasting program as the recommended program corresponding to the user's view profile. The server 2 may fill the other timeslots of the recommended list 8 with the recommended programs 90 corresponding to the user's view profile. In the recommended list 8, the recommended program 83 having a higher priority and the recommended programs 90 having a lower priority may have different tag values to be distinguishable from each other.

Figure 10:
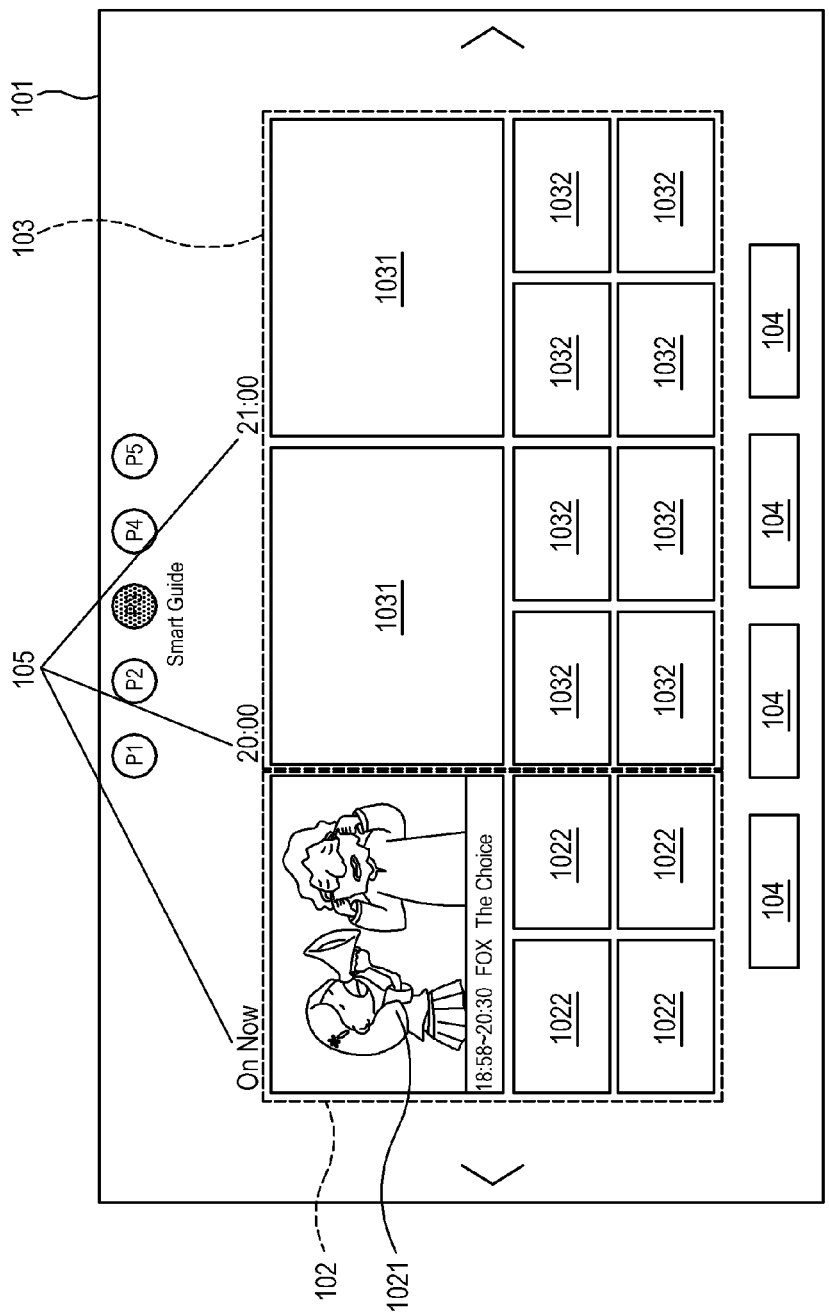
FIG. 10 illustrates an example of a graphic user interface (GUI) showing schedule information in accordance with timeslots of recommended programs provided by a display apparatus according to an exemplary embodiment.

The display apparatus 1 may provide a user with schedule information according to the timeslots of the recommended program based on the recommended list received from the server 2. The schedule information according to the timeslots of the recommended program may be provided in the form of a graphic user interface (GUI). FIG. 10 illustrates an example of a GUI showing the schedule information in accordance with timeslots of recommended programs provided by a display apparatus according to an exemplary embodiment. A GUI 101 shows the schedule information of the recommended program in accordance with timeslots 105. The GUI 101 may include a first region 102 for showing the recommended program being currently broadcasted, and a second region for showing the recommended program to be broadcasted at a later time. The first area 102 and the second area 103 may include a plurality of sub areas 1021, 1022, 1031 and 1032. The plurality of sub areas 1021, 1022, 1031 and 1032 may show information of the recommended programs broadcasted at a corresponding timeslot, respectively. The information of the recommended program may include a thumbnail image, a detailed time schedule, channel information, a program title, other additional information, etc. of the recommended program. The plurality of sub regions 1021, 1022, 1031 and 1032 may have the same size or different sizes. The display apparatus 1 may display the information of the recommended programs of timeslots different from the currently displayed timeslot 105 on the GUI 101 in response to a user's command. That is, a user may use up, down, left and right buttons or the like of a remote controller to navigate the information of the recommended program shown on the GUI 101. The display apparatus 1 may turn to the recommended program being currently broadcasted in response to selection of the user through the GUI 101 so that the user may view the recommended program. The GUI 101 may further include a shortcut item 104 to be selectable by the user. The shortcut item 104 may include a user's favorite channel, a recorded broadcasting program, the preferential recommended program, etc. When the user selects the shortcut item 104, the display apparatus 1 may provide a channel or information of the broadcasting program corresponding to the selected shortcut item 104.

Figure 11:
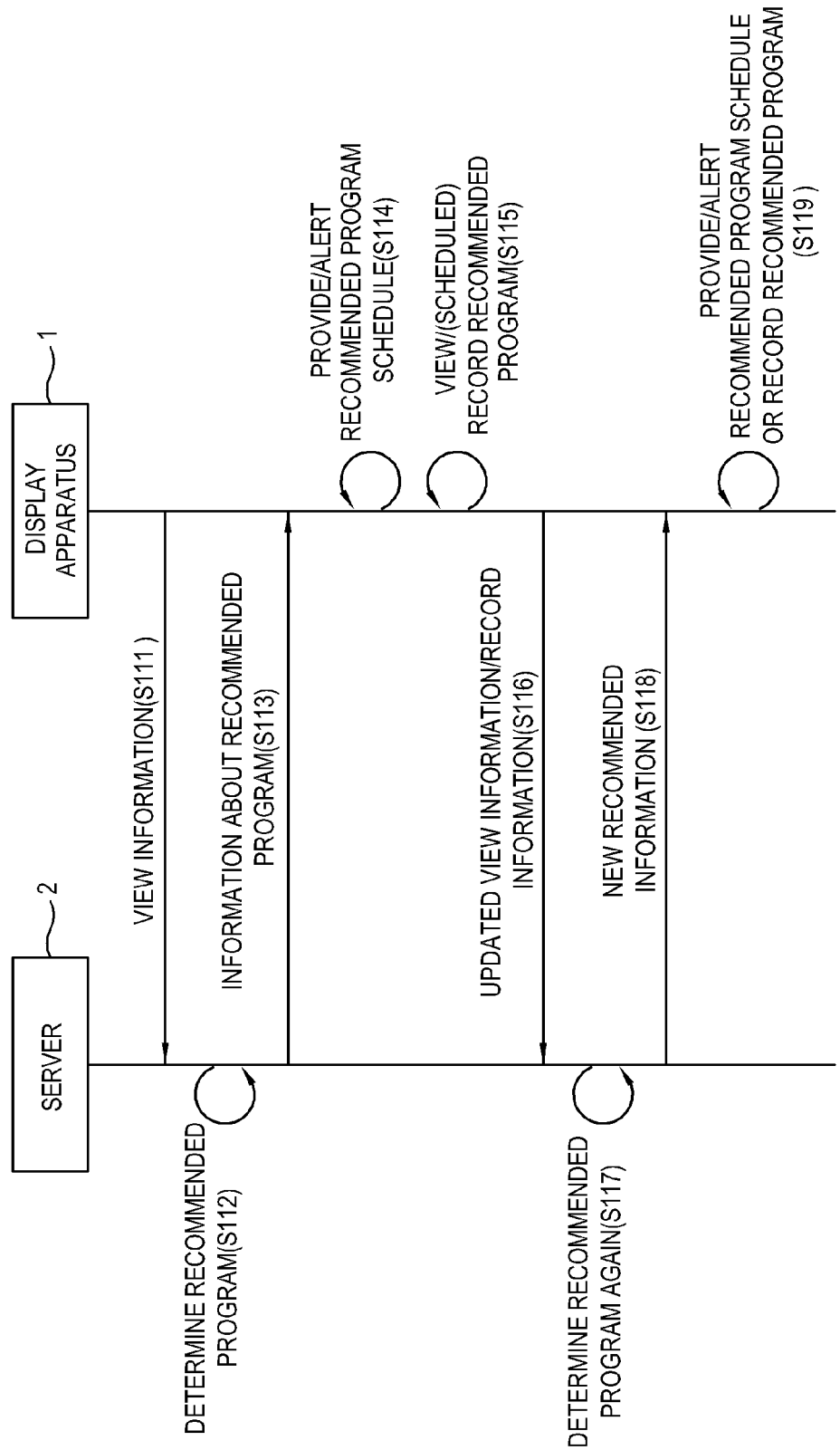
FIG. 11 illustrates detailed interactive operations between a display apparatus and a server according to an exemplary embodiment.

FIG. 11 illustrates detailed interactive operations between the display apparatus 1 and the server 2 according to an exemplary embodiment. The display apparatus 1 transmits a user's collected view information to the server 2 (S111). The server 2 determines the recommended program based on a user's view information received from the display apparatus 1 (S112). The server 2 transmits the information of the determined recommended program, for example, the recommended list to the display apparatus 1 (S113). The display apparatus 1 provides the schedule information of the recommended program based on the recommended list received from the server 2 (S114). Also, the display apparatus 1 may notify a user about a recommended program of the recommended list received from the server 2 (hereinafter, referred to as 'recommending notification'). In detail, the display apparatus 1 may perform the recommending notification when a user views another broadcasting program in a timeslot during which the recommended program is being broadcasted. The display apparatus 1 may perform the recommending notification with respect to the recommended program having a higher priority among the recommended programs of the recommended list received from the server 2.

Figure 12:
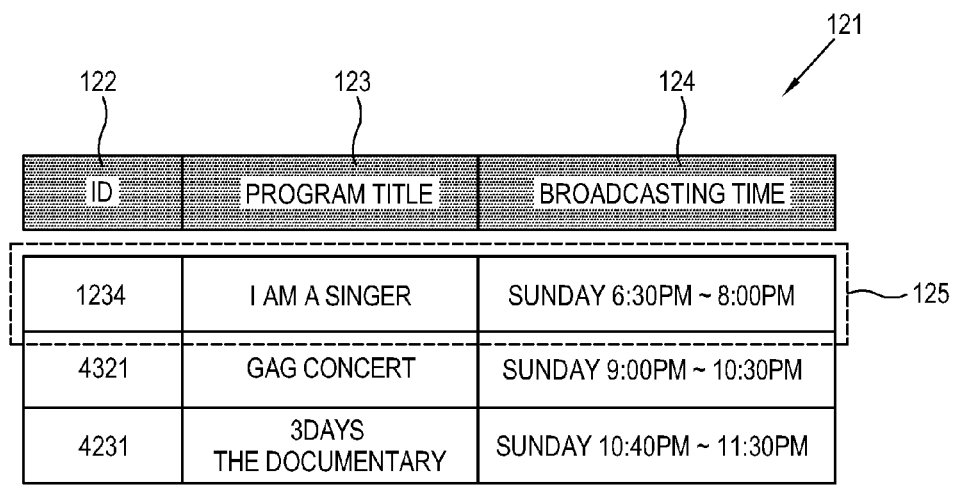
FIG. 12 illustrates an example of management information about a recommended program for recommendation alert according to an exemplary embodiment.
Figure 13:
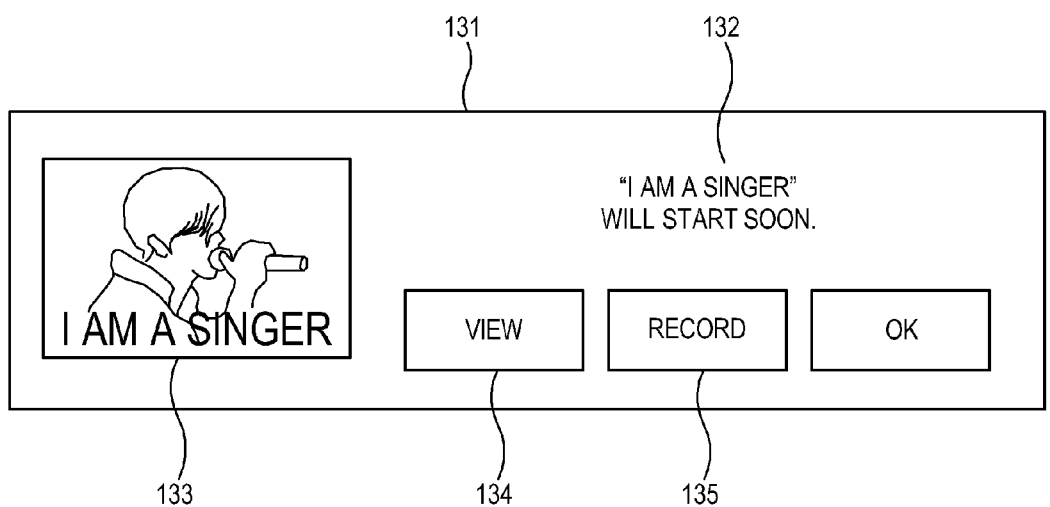
FIG. 13 illustrates an example of a GUI for a recommendation alert displayed on a display apparatus according to an exemplary embodiment.
Figure 14:
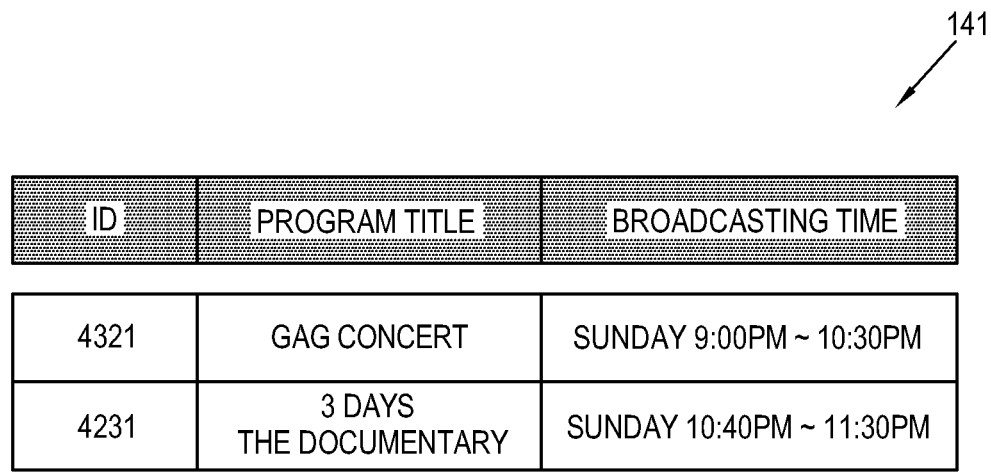
FIG. 14 illustrates another example of management information about a recommended program for recommendation alert according to an exemplary embodiment.

FIG. 12 illustrates an example of management information about a recommended program for recommendation alert according to an exemplary embodiment. The management information 121 of the recommended program may include identification (ID) 122 of the recommended program, a program title 123 and a broadcasting time 124. For example, the management information 121 of the recommended program may include information 125 of a recommended program having ID 1234, titled "I am a singer", of which broadcasting time is Sunday, from 6:30 P.M. to 8:00 P.M. The display apparatus 1 may generate and store the management information 121 of the recommended program based on the recommended list. In the management information 121 of the recommended program, a plurality of recommended programs to be recommended may be listed in sequence. The display apparatus 1 may refer to the management information 121 of the recommended program, and when a timeslot for broadcasting a certain recommended program arrives, performs the recommending notification for the corresponding recommended program. The display apparatus 1 may perform the recommending notification for the recommended program in the form of a GUI. FIG. 13 illustrates an example of a GUI 131 for recommendation alert displayed by a display apparatus according to an exemplary embodiment. The GUI 131 of the recommending notification may include a thumbnail image 133 of the recommended program ("I am a singer") and a notification message 132 (""I am a singer" will start soon"). The GUI 131 of the recommending notification may further include an item 134, which is selectable by a user, to enter a command for viewing the recommended program 133 corresponding to the current notification. When the user selects the item 134 of the GUI 131, the display apparatus 1 tunes to the recommended program 133 so that the user may view the recommended program 133. When the recommending notification for a certain recommended program is completed, the display apparatus 1 reflects the completion of the recommending notification on to the management information 121 of the recommended program. That is, the display apparatus 1 may delete the information 125 of the recommended program, for which the recommending notification is completed, from the management information 121 of the recommended program. As a result of the deletion, as shown in FIG. 14, the management information 141 of the recommended program does not include the information 125 of the recommended program, for which the recommending notification is completed. The display apparatus may refer to the management information 141 of the recommended program and perform the recommending notification for the next recommended program.

Referring back to FIG. 11, the display apparatus 1 allows a user to view the recommended program (S115). Also, the display apparatus 1 may record the recommended program. The record for the recommended program may be achieved by a user's request or automatically. The display apparatus 1 may record the corresponding recommended program when a user does not view the recommended program. For example, when a user views another broadcasting program in a timeslot during which the recommended program is being broadcasted, or when the display apparatus 1 is turned off, the display apparatus 1 may record the recommended program. In the case that the display apparatus 1 is turned off, the display apparatus 1 may automatically wake up from a sleep mode or a power-saving mode at a timeslot for broadcasting the recommended program, and record the corresponding recommended program. The recording for the recommended program may be previously scheduled by a user's command (hereinafter, referred to as 'scheduled recording'). The display apparatus 1 may receive a user's command for recording or scheduled recording of the recommended program through the GUI. For example, referring to FIG. 13, the GUI 131 may further include an item 135 for receiving a user's command for recording or scheduling a recording of the recommended program. When a user selects the item 135 of the GUI 131, the display apparatus 1 may perform the recording or the scheduled recording of the corresponding recommended program. The recorded recommended program may be viewed later by a request from the user. For example, when the user requests viewing of the recorded recommended program through the item 104 of the GUI 101 shown in FIG. 10, the display apparatus 1 may show the user the corresponding recorded recommended program. Alternatively, when the recommended program has not been viewed yet by the user, the display apparatus 1 may provide the user with video on demand (VOD) contents related to the corresponding recommended program.

Referring back to FIG. 11, the display apparatus 1 may send the server 2 the view information about whether a user has already viewed the recommended program (S116). Also, the display apparatus 1 may also transmit the view information about the recording or the scheduled recording of the recommended program to the server 2. The server 2 may determine the recommended program of a corresponding user again based on an updated user's view information received from the display apparatus 1 (S117). Thus, a certain recommended program may be added to or excluded from the recommended list. The server 2 transmits new recommended information of the re-determined recommended program to the display apparatus (S118). The display apparatus 1 provides the schedule information of the recommended program updated based on the new recommended information, and performs the recommending notification or the recording/scheduled recording, etc. (S119).

Figure 15:
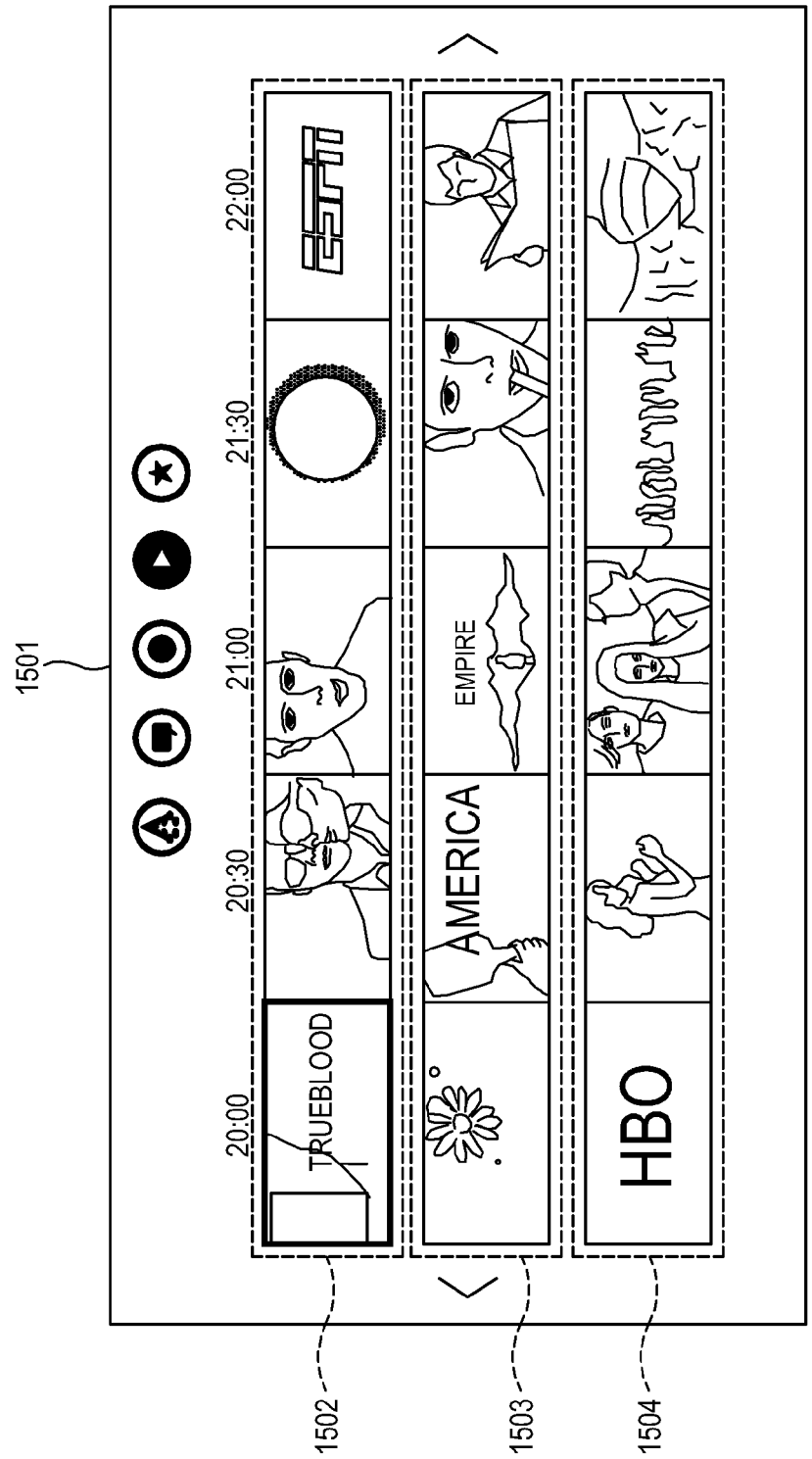
FIG. 15 illustrates another example of a GUI showing schedule information about a recommended program provided by a display apparatus according to an exemplary embodiment.
Figure 16:
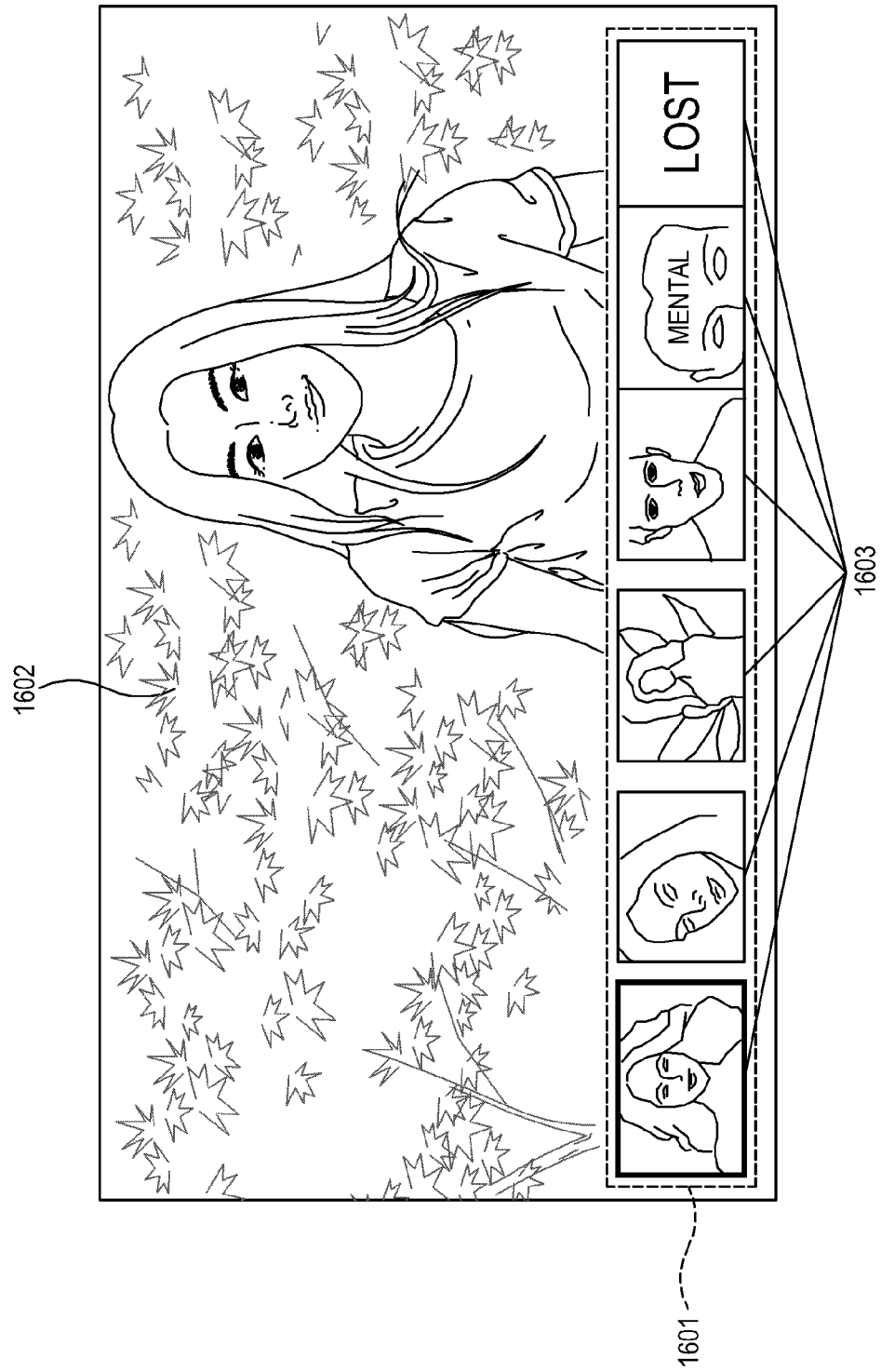
FIG. 16 illustrates an example of a GUI showing related information about a recommended program provided by a display apparatus according to an exemplary embodiment.

FIG. 15 illustrates another example of a GUI showing schedule information about a recommended program provided by the display apparatus 1 according to an exemplary embodiment. The GUI 1501 may display a plurality of recommended programs 1502, 1503 and 1504 to be listed in accordance with respective priorities thereof. For example, for illustrative purposes, it is assumed that recommended programs 1502 have a highest priority, recommended programs 1503 have a next highest priority, and recommended programs 1504 have a lowest priority. FIG. 16 illustrates an example of a GUI showing related information about a recommended program provided by a display apparatus according to an exemplary embodiment. A GUI 1601 may be displayed together with a currently displayed broadcasting program 1602. For example, the GUI 1601 may be displayed in a lower region of a screen. The GUI 1601 may include information 1603 of a corresponding recommended program 1602 related to the currently displayed broadcasting program 1602. For example, the information 1603 of the related recommended program 1602 may include items of another episode of the currently displayed broadcasting program 1602, and a different recommended program or the like related to an actor, an actress, or a casting of the currently displayed broadcasting program 1602. When a user selects the item 1603 of the GUI 1601, the display apparatus 1 may provide information corresponding to the selected item 1603.

Thus, when there is a plurality of channels or broadcasting programs provided from the display apparatus 1, the display apparatus 1 and the server 2 according to an exemplary embodiment may sort the broadcasting programs that are preferable by a user among the plurality of channels or broadcasting programs. Accordingly, without requiring any separate input or behavior of a user, the display apparatus 1 or the server 2 may provide the schedule information of the recommended program, thereby assisting a user to view the recommended broadcasting program. Compared to a related art EPG, which simply lists the broadcasting programs with respect to channels and timeslots, the schedule information of the recommended program provided by the display apparatus 1 and the server 2 according to an exemplary embodiment are customized to an individual user and provide user's preferable programs sorted based on a user's viewing pattern or history. Also, the schedule information of the recommended program provided by the display apparatus 1 and the server 2 according to an exemplary embodiment may recommend broadcasting programs, which are likely to be viewed by the user, in the form of timeslot schedules based on detailed analysis of a user's viewing pattern, thereby allowing the user to easily and conveniently find and view broadcasting program to the user's liking. Further, when the frequently viewed and favorable broadcasting program (or the recommended program) is not viewed by a user, the display apparatus 1 may record the corresponding recommended program or provide a user with related VOD contents, thereby improving user convenience.

As described above, according to an exemplary embodiment, it is possible to provide information of a broadcasting program preferred by a user or perform view, alert, record, scheduled view/record, etc. for the broadcasting program without any control of the user, thereby improving a user's convenience.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display configured to display an image of a broadcasting program;
a communication section configured to communicate with a server through a network; and
a controller configured to control the communication section to transmit view information about a broadcasting program viewed by a user to the server, receive information about a recommended broadcasting program corresponding to the view information from the server through the communication section, and control the display to provide schedule information of the recommended broadcasting program in accordance with a time slot in which the recommended broadcasting program is broadcasted,
wherein a particular recommended broadcasting program comprises a series of episodes, and the controller controls the communication section to transmit updated view information to the server in response to two or more of consecutive episodes of the particular recommended broadcasting program not being viewed by the user, and receive new information about the recommended broadcasting program that excludes the particular recommended broadcasting program.

2. The display apparatus according to claim 1, wherein the controller controls to record the recommended broadcasting program when the user does not view the recommended broadcasting program at the time slot in which the recommended broadcasting program is broadcasted.

3. The display apparatus according to claim 1, wherein the controller controls to provide video on demand (VOD) of the recommended broadcasting program when the user does not view the recommended broadcasting program at the time slot in which the recommended broadcasting program is broadcasted.

4. The display apparatus according to claim 1, wherein the view information comprises information about at least one from among a viewed channel, a title of the viewed broadcasting program, and a viewing time.

5. The display apparatus according to claim 1, wherein the recommended broadcasting program corresponds to a view profile of the user including at least one from among a title, a cast, a director, a genre, a synopsis of the viewed broadcasting program, and
wherein the controller controls the display to display a thumbnail image of the recommended broadcasting program.

6. The display apparatus according to claim 1, wherein the controller controls the display to display the schedule information about a plurality of recommended broadcasting program in a form of a graphic user interface (GUI) thereon, and
wherein the GUI comprises a separate shortcut icon that is designated to at least one of a channel and a program, the at least one of the channel and the program being preset among the plurality of recommended broadcasting programs.

7. The display apparatus according to claim 1, wherein a recommended broadcasting program having a higher priority has a higher probability to be viewed by the user,
wherein the controller controls the display to display a first GUI including schedule information about a plurality of first recommended broadcasting programs, the plurality of first recommended broadcasting programs having a first priority, and controls the display to display a second GUI including schedule information about a plurality of second recommended broadcasting programs, the plurality of second recommended broadcasting programs having a second priority different from the first priority, and
wherein the first GUI and the second GUI are separate from each other.

8. The display apparatus according to claim 1, wherein the controller notifies the user about the recommended broadcasting program when another broadcasting program is displayed while the recommended broadcasting program is being broadcasted.

9. The display apparatus according to claim 1, wherein the controller sends the server information about whether to record the recommended broadcasting program.

10. The display apparatus of claim 1, wherein the controller wakes up from a sleep mode or a power-saving mode when a time period during which the recommended broadcasting program is broadcasted approaches, and records the recommended broadcasting program.

11. A method of controlling a display apparatus, the method comprising:
sending, to a server, view information about a broadcasting program viewed by a user through a network;
receiving information about a recommend broadcasting program corresponding to the view information from the server; and
providing schedule information about the recommended broadcasting program in accordance with a time slot in which the recommended broadcasting program is broadcasted,
wherein a particular recommended broadcasting program comprises a series of episodes, the sending comprises sending updated view information to the server in response to two or more of consecutive episodes of the particular recommended broadcasting program not being viewed by the user, and the receiving comprises receiving new information about the recommended broadcasting program that excludes the particular recommended broadcasting program from the server.

12. The method according to claim 11, further comprising recording the recommended broadcasting program when the user does not view the recommended broadcasting program at the time slot in which the recommended broadcasting program is broadcasted.

13. The method according to claim 11, further comprising providing video on demand (VOD) of the recommended broadcasting program when the user does not view the recommended broadcasting program at the time slot in which the recommended broadcasting program is broadcasted.

14. The method according to claim 11, wherein the view information comprises information about at least one from among a viewed channel, a title of the viewed broadcasting program, and a viewing time.

15. The method according to claim 11, wherein the recommended broadcasting program corresponds to a view profile of the user including at least one from among a title, a cast, a director, a genre, a synopsis of the viewed broadcasting program, and
wherein the providing the schedule information comprises displaying a thumbnail image of the recommended broadcasting program.

16. The method according to claim 11, wherein the providing the schedule information comprises displaying the schedule information about a plurality of recommended broadcasting program in a form of a graphic user interface (GUI), and
wherein the GUI comprises a separate shortcut icon that is designated to at least one of a channel and a program, the at least one of the channel and the program being preset among the plurality of recommended broadcasting programs.

17. The method according to claim 11, wherein a recommended broadcasting program having a higher priority has a higher probability to be viewed by the user,
wherein the controller controls the display to display a first GUI including schedule information about a plurality of first recommended broadcasting programs, the plurality of first recommended broadcasting programs having a first priority, and controls the display to display a second GUI including schedule information about a plurality of second recommended broadcasting programs, the plurality of second recommended broadcasting programs having a second priority different from the first priority, and
wherein the first GUI and the second GUI are separate from each other.

18. The method according to claim 11, further comprising notifying the user about the recommended broadcasting program, when another broadcasting program is displayed while the recommended broadcasting program is being broadcasted.

19. The method according to claim 11, further comprising sending the server information about whether to record the recommended broadcasting program.

20. The method of claim 11, further comprising waking up from a sleep mode or a power-saving mode when a time period during which the recommended broadcasting program is broadcasted approaches, and recording the recommended broadcasting program.

21. A display apparatus comprising:
  a display configured to display a broadcast program; and
  a controller configured to control the display to provide information about at least one recommended broadcast program based on an analysis of information of at least one broadcast program viewed by a user,
  wherein a particular recommended broadcasting program comprises a series of episodes, and the controller updates view information in response to two or more of consecutive episodes of the particular recommended broadcasting program not being viewed by the user, and controls the display to provide new information about the recommended broadcasting program that excludes the particular recommended broadcasting program.

22. The display apparatus according to claim 21, wherein the controller updates information according to a predetermined period of time.

23. The display apparatus of claim 21, wherein the display displays the information about the at least one recommended broadcast program a predetermined period of time prior to broadcasting of the recommended program.

24. The display apparatus of claim 21, wherein the display displays the information about the at least one recommended broadcast program when a time slot for broadcasting the recommended program arrives.

25. The display apparatus according to claim 21, further comprising a user interface configured to receive a user input, wherein the controller, in response to the user input received through the user interface, controls the display apparatus to perform at least one from among displaying, recording, scheduling a recording of the corresponding recommended program.

* * * * *